Figure 1:
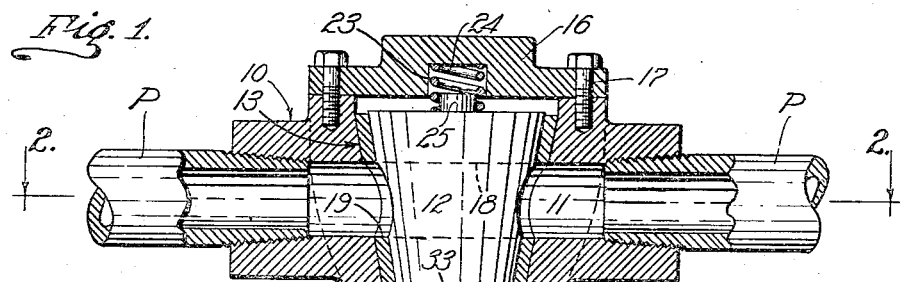

July 17, 1934.  C. H. SWEET ET AL  1,966,807

STOP COCK

Filed June 1, 1931

Inventors
Cecil H. Sweet
and
Weldon C. Erwin
By [signature]
His Attorney

Patented July 17, 1934

1,966,807

UNITED STATES PATENT OFFICE 1,966,807

STOP COCK

Cecil H. Sweet and Weldon C. Erwin, Brea, Calif.

Application June 1, 1931, Serial No. 541,198

10 Claims. (Cl. 251—97)

This invention relates to a device for controlling the flow of fluid, and relates more particularly to a stop cock. It is a general object of this invention to provide a practical and effective stop cock for handling fluid at high pressures.

Considerable difficulty has been encountered in providing a stop cock for use in pipe lines or conduits passing fluid at high pressures, e. g., in slush pump manifolds and headers passing rotary mud used in connection with well drilling. Stop cocks employed in such situations must be of sturdy construction and capable of withstanding high pressures and hard usage. In the common forms of stop cocks, the cores or plugs must often be struck heavy blows with a hammer, or the like, before they can be turned or operated, and the bodies and cores of the valves are sometimes injured in this manner. Further, the common forms of stop cocks soon cut out and leak between the body and plug and require early replacement.

An object of the present invention is to provide a stop cock in which the plug may be easily and quickly operated between the open and closed positions. In the device provided by the present invention, the plug may be turned between the open and closed positions without striking or hammering.

Another object of the invention is to provide a stop cock having a plug operating means that is such that the plug may be loosened for turning through a jarring action made possible by a loose shouldered connection between the plug and operating stem.

Another object of the invention is to provide a stop cock having a replaceable liner for mounting the plug in the body. In the present invention, the wear due to operation of the plug occurs between the plug and a stationary replaceable liner which may be formed of suitable metal and which is easily replaceable.

Another object of the invention is to provide a stop cock of the character mentioned that is particularly adapted for handling liquid containing solid matter.

It is another object of our invention to provide a stop cock having means at one end of the plug for urging or forcing it into tight sealing engagement with the liner and a means at the opposite end of the plug for urging or breaking it loose from the liner so that it may be readily turned. In accordance with the invention, either or both of the means just referred to may be employed to turn or operate the plug between the open and closed positions.

A further object of the invention is to provide a stop cock of the character mentioned that is simple and sturdy in construction and that is inexpensive and practical of manufacture.

Figures 3, 4:
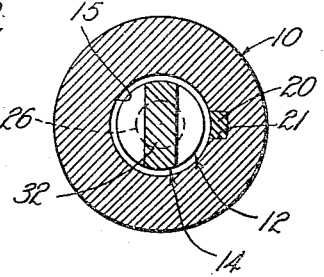
Figure 2:
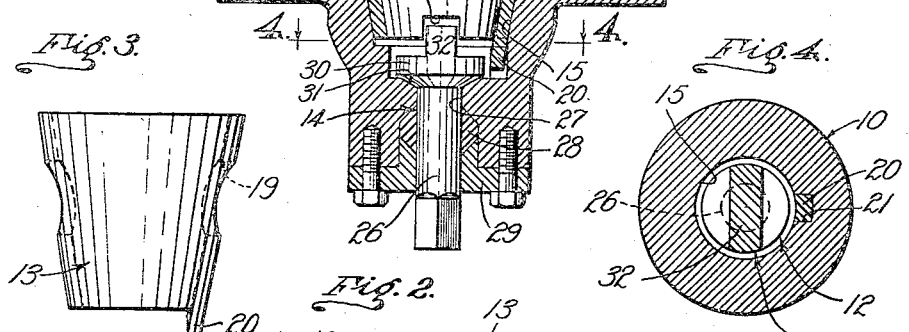
Figures 5, 6:
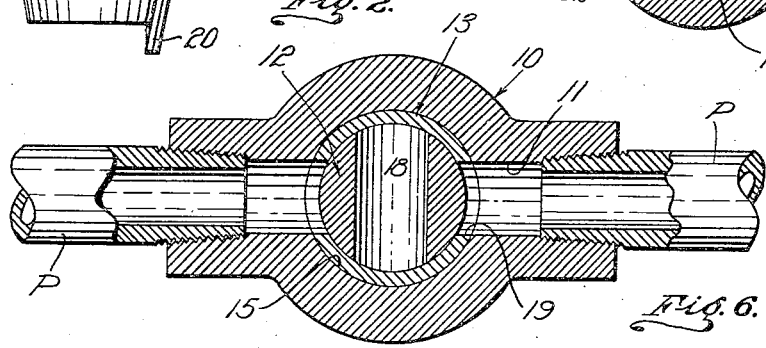

Other objects and features of the invention will be best and more fully understood from the following detailed description of typical forms and applications of the invention, throughout which description reference will be had to the accompanying drawing, in which:

Fig. 1 is a vertical detailed sectional view of one embodiment of the invention, being a view illustrating the plug in the open position. Fig. 2 is a horizontal detailed sectional view taken as indicated by line 2—2 on Fig. 1 and showing the plug in the closed position. Fig. 3 is a side elevation of the liner embodied in the device. Fig. 4 is a horizontal detailed sectional view taken as indicated by line 4—4 on Fig. 1. Fig. 5 is a vertical detailed sectional view of another embodiment of the invention, and Fig. 6 is a bottom plan view of the head of the loosening means, being a view taken substantially as indicated by line 6—6 on Fig. 5.

The stop cocks provided by this invention may be constructed for use in various situations and for handling various classes of fluids. Throughout the following detailed disclosure of the invention, we will describe two simple embodiments suited for handling liquid cotnaining solid matter, it being understood that the invention is not to be taken as restricted to the particular forms or applications about to be described.

The form of the invention illustrated in Figs. 1 to 4 inclusive of the drawing includes, generally, a body 10 having a fluid passage 11, a core or plug 12 operable to close the fluid passage 11, a liner 13 for mounting the plug 12 in the body 10, and means 14 for operating or turning the plug 12.

The body 10 may be strongly constructed to withstand high pressures and hard usage. The fluid passage 11 extends completely through the body 10, and its opposite end portions may be screw-threaded to receive the ends of pipes P. It is to be understood that the body 10 may be provided with flanges at the opposite ends of the passage 11 for connection with flanges or flanged fittings of a pipe line. The opening 15 is provided in the body 10 to carry the plug 12. The plug opening 15 is of round cross section and intersects the fluid passage 11. The opening 15 extends into, what we will term, the upper end of the body 10 and terminates at its lower end within the body. In the preferred construction, the longitudinal axis of the opening 15 is at right angles to the longitudinal axis of the fluid passage 11. The plug opening 15 is tapered downwardly and inwardly throughout the greater part of its length. A plate or cap 16 closes the upper end of the plug opening 15. Suitable studs or screws 17 may be provided to attach the cap 16 to the body 10.

The plug 12 is mounted in the opening 15 through the liner 13 and is operable to close the fluid passage 11. The plug 12 is tapered downwardly and inwardly and is of round cross sectional configuration. In the form of the invention being described, the plug 12 is tapered throughout its entire length and its opposite ends are flat and normal to its longitudinal axis. A transverse passage or opening 18 is provided in the plug 12 intermediate its ends. The opening 18 may be of round cross section and is positioned so as to come into and out of register with the fluid passage 11 when the plug is operated or turned.

The liner 13 is arranged in the opening 15 to carry the plug 12 and to provide a seal between the plug 12 and the walls of the opening 15. The liner 13 is a hollow or tubular frusto-conical member and is formed of a suitable material. In accordance with the invention, the liner 13 is proportioned to effectively seat in the opening 15 and receive the plug 12, and is readily replaceable. Diametrically opposite openings or ports 19 are provided in the walls of the liner 13 to register with the ends of the fluid passage 11. The invention provides means for holding the liner 13 against rotation so that its ports 19 always remain in proper alignment with the fluid passage 11. A downwardly projecting lug 20 is provided on the lower end of the liner 13 and fits into a socket 21 in the body 10 at the lower end of the opening 15. The lug 20 co-operates with the socket 21 to hold the liner against turning or rotation.

Means may be provided for urging the plug 12 downwardly to effectively seat in the liner 13. A helical spring 23 may be arranged under compression between the upper end of the plug 12 and the cap 16. A socket 24 may be provided in the lower side of the cap 16 to carry the upper end of the spring, while a guide projection 25 may be provided on the upper end of the plug to extend into the lower end of the spring. The spring 23 operates to yieldingly urge the plug 12 downwardly so that it is normally held in proper engagement with the liner 13.

The means 14 for operating or turning the plug 12 includes a stem 26 freely slidable and rotatable in a vertical opening 27 in the lower end of the body 10. The operating stem 26 projects from the lower end of the body 10, and its lower end is polygonal so as to be readily engaged by a wrench, or the like. Packing 28 is provided in the opening 27 to seal about the stem, and a gland or follower 29 is provided to compress the packing. A head 30 is provided on the upper end of the stem 26 within the plug opening 15. The lower end of the head 30 is in the nature of a valve face, being tapered downwardly and inwardly, and is adapted to co-operate with a sealing face 31 around the upper end of the opening 27. The fluid pressure within the opening 15 operates to normally hold the head 30 down in a position where its lower end seals with the seat 31. The upper end of the head 30 is flat and is normally spaced below the lower end of the plug 12.

A loose operative connection is provided between the head 30 and the lower end of the plug 12. An upwardly projecting key 32 is provided on the head 30 to fit into a diametric slot 33 in the lower end of the plug. The key 32 is provided with flat parallel sides and a flat upper end to effectively co-operate with the slot 33 which is rectangular in cross section. The key 32 is proportioned so that its sides and top are normally spaced from the walls of the slot 33.

With the construction just described, the stem 26 may be operated or turned quickly to cause the sides of the key 32 to come into jarring or hammering engagement with the side walls of the slot 33 to loosen the plug 12 from the liner 13. In the event that the plug cannot be loosened or operated in this manner, the stem 26 may be struck with a hammer, or the like, to drive the plug upwardly so as to loosen it for operation. It will be readily apparent how the loose shouldered connection between the stem 26 and the plug 12 is such that an effective jarring action may be obtained for breaking the plug loose from the liner and for turning it in the liner. The plug 12 is completely enclosed in the body so that it cannot be injured, and the means 14 is such that it is not necessary to strike or jar the body 10. Quick turning movement of the stem 26 provides the hammering or jarring action that loosens the plug 12 so that it may be easily turned. The spring 26 urges the plug downwardly so that an effective seal is maintained between the body 10 and the plug 12. The key 32 is normally free of the plug 12 so that it does not interfere with the action of the spring 23. The liner 13 may be easily and quickly replaced by removing the cap 16 and the plug 12. The lug 20 operates to normally retain the liner 13 in its proper position and holds it against turning during operation of the plug 12.

The embodiment of the invention illustrated in Figs. 5 and 6 of the drawings includes, generally, a body 40 having a fluid passage 41, a plug 42 for controlling the flow of fluid through the passage 41, a liner 43 for mounting the plug in the body, operating means 44 at one end of the plug 42 for urging it downwardly in the liner 43, and operating means 45 at the other end of the plug for operating it upwardly for breaking it loose from the liner.

The body 40, the plug 42, and the liner 43 may be substantially identical with the body 10, the plug 12, and the liner 13 described above. The body 40 is provided with a plug-carrying opening 46 intersecting the fluid passage 41. The upper end of the opening 46 is closed by a cap 47 attached to the body by screws 48. The opening 46 is tapered downwardly and inwardly and its longitudinal axis is normal to the longitudinal axis of the fluid passage 41. The plug 42 is mounted in the liner 43 within the opening 46 and is provided with a transverse opening 49 for registering with the fluid passage 41. The plug 42 is tapered downwardly and inwardly and the liner 43 is shaped to effectively seal between the plug and the walls of the opening 46. Diametrically opposite openings 50 are provided in the walls of the liner 43 to register with the fluid passage 41. The liner 43 is removable from the body 10 so that it may be replaced when worn, and means is provided for holding the liner against turning in the opening 46. A lug 51 is provided in the lower end of the liner to co-operate with a socket 52 in the body to hold the liner against turning.

The means 44 is operable to force the plug 12 downwardly in the liner 43 to provide a tight seal between the plug and liner and to tightly seat the liner in the opening 46. The means 44 is also operable to turn and/or jar the plug 12 around between the open position where its opening 49 registers with the fluid passage 41 and the closed position where the plug closes the fluid passage. The means 44 includes a stem 53 freely slidable and rotatable in a vertical opening 54 in the cap 47. The stem 53 projects upward from the cap 47, and its upper end is polygonal so as to be readily engaged by a suitable tool. A packing gland 55 may be provided on the cap 47 to seal about the stem 53.

An enlargement or head 56 is provided on the lower end of the stem 53 within the upper end of the opening 46. A tapered sealing face 80 may be provided on the upper end of the head 56 to co-operate with a seat 81 at the inner end of the opening 54. In accordance with the invention, the head 56 and the upper end of the plug 42 are provided with parts that are adapted to co-operate upon rotation of the head to force the plug 42 downwardly. A spiralled or helicoidal face 57 is provided on the lower end or under side of the head 56. The opposite ends of the spiralled face 57 terminate in a vertical shoulder 58. A correspondingly shaped helicoidal face 59 is provided on the upper end of the plug 42 to be engaged by the face 47. The spiralled face 59 is parallel with the face 57 and its opposite ends terminate in a vertical shoulder 60. Upon the stem 53 being rotated in one direction, the spiralled face 57 co-operates with the face 59 on the upper end of the plug 42 to force or urge the plug 42 downwardly in the liner 43. Rotation or turning of the stem 53 in the opposite direction brings the shoulder 58 into engagement with the shoulder 60 so that the turning force is transmitted to the plug 42 to provide for the turning of the plug. Further, the stem may be quickly and forcibly turned in the said opposite direction to bring the shoulders 58 and 60 into jarring engagement to break the plug loose and to jar it around in the liner. It will be apparent how the means 44 is operable, upon turning of the stem 53 in one direction, to urge the plug 42 downwardly and provide for the effective sealing engagement of the plug with the liner 43. The head 56 is proportioned so that the faces 57 and 59 may be spaced apart, as illustrated in Fig. 5 of the drawings.

If desired or found necessary, spring means may be provided for normally yieldingly urging the plug 42 downwardly. In the drawings, we have illustrated a spring 61 arranged under compression between the head 56 and the upper end of the plug 42. Spaced sockets 62 are provided in the head and plug to receive the opposite end parts of the spring 61. The spring 61 operates to normally hold the head 56 upwardly in engagement with the cap 47 and to urge the plug 42 downwardly. It is to be understood that the spring means just described may be eliminated if desired, as the means 44 is operable to force the plug 42 downwardly into proper engagement with the liner 43 so that the spring means may not be necessary.

The operating means 45 is operable to loosen the plug and shift it upwardly and, like the means 44, may be operated to turn the plug between the open and closed positions, and, if necessary, to jar the plug loose. The means 45 includes a stem 65 freely slidable and rotatable in a vertical opening 66 in the lower end of the body. A suitable packing gland 67 may be provided in the opening 66 to seal about the stem 65. The stem 65 projects downwardly from the body 40, and its lower end is made polygonal for engagement by a wrench, or the like. A head or enlargement 68 is provided on the upper end of the stem 65 within the lower end of the opening 46. The lower end of the head 68 is in the nature of a tapered sealing face, and is adapted to co-operate with a seat 69 provided around the upper end of the opening 66. A spiralled or helicoidal face 70 is provided on the upper end of the head 65 to co-operate with a similar spiralled face 71 on the lower end of the plug 42. The spiralled face 70 terminates at its opposite ends in a vertical shoulder 72, while the opposite ends of the spiralled face 71 terminate in a vertical shoulder 73. The enlargement 68 is proportioned so that its face 70 may normally be spaced below the face 71. Upon rotation of the stem 65 in one direction, the face 70 co-operates with the spiralled face 71 to cause the plug 42 to be forced upwardly in the liner 43. Rotation of the stem 65 in the opposite direction causes the shoulder 72 to bear against the shoulder 73 and transmit the turning strains to the stem 42. The shoulders 72 and 73 may be jarred together to loosen the plug from the liner.

It is believed that the utility and operation of the device illustrated in Figs. 5 and 6 of the drawings will be readily apparent from the foregoing detailed description. The plug 42 may be positioned or turned to the open position by rotating either the stem 53 or the stem 65 in the manner described above. The stem 53 may be rotated to bring the spiralled face 57 into co-operation with the face 59 to force the plug 42 downwardly. Downward urging of the plug 42 in this manner causes it to effectively seat in the liner 43 so that a tight seal is provided between the body 40 and the plug. In turning the plug from the open to the closed position, the stem 53 may be turned so that the shoulder 58 transmits the turning thrusts to the plug 42 through the shoulder 60, or the stem 45 may be turned so that the shoulder 72 engages the shoulder 73 to transmit the turning thrust to the plug. It is to be noted that the means 44 and 45 are each operable to turn the plug 12 in only one direction, and that these directions are opposite. In the event that the plug 42 resists turning or becomes immovable in the liner 43, either the stem 53 or the stem 65, or both, may be suddenly and forcibly turned to bring their shoulders into jarring or hammering engagement with the shoulders of the plug to break the plug loose from the liner. Further, the means 45 may be employed to force the plug 42 upwardly in the liner 43 and thus loosen it. To force the plug upwardly, the stem 65 is turned so that the spiralled face 70 cooperates with the face 71. Co-operation between the spiralled faces 70 and 71 causes the plug 42 to be shifted upwardly and out of binding engagement with the liner 43. It is to be noted that the embodiment of the invention disclosed in Figs. 5 and 6 of the drawing includes an effective means for tightly seating the plug in proper engagement with the liner and also a means for breaking the plug loose from the liner. Both the means 44 and 45 may be employed to turn the plug, and both may be employed to jar the plug loose for turning in the manner described above.

Having described only typical preferred forms of the invention, we do not wish to limit ourselves to the specific details set forth, but wish to reserve to ourselves all changes and variations that may appear to those skilled in the art or fall within the scope of the following claims:

Having described our invention, we claim:

1. A stop cock including, a body having a fluid passage and a tapered opening intersecting the fluid passage, a tapered plug in the opening operable to close the fluid passage, means for operating the plug between the open and closed positions and for urging the plug out of the opening, and manually operable means for urging the plug into the opening, the last mentioned means being operable to turn the plug.

2. A stop cock including, a body having a fluid passage and a tapered opening intersecting the fluid passage, a tapered plug in the opening operable to close the fluid passage, means for operating the plug between the open and closed positions, and means for urging the plug into the opening, said means including a spiralled face on an end of the plug, a rotatable stem, and a spiralled face on the stem for co-operation with the face on the plug.

3. A stop cock including, a body having a fluid passage and a tapered opening intersecting the fluid passage, a tapered plug in the opening operable to close the fluid passage, and means operable to jar the plug and to urge the plug longitudinally including a spiralled face on the plug terminating in a shoulder, a rotatable stem, and a spiralled face on an end of the stem for co-operating with the face on the plug and terminating in a shoulder adapted to jar against the shoulder on the plug.

4. A stop cock including, a body having a fluid passage and a tapered opening intersecting the fluid passage, a tapered plug in the opening operable to close the fluid passage, means at one end of the body operable to urge the plug downward, and means at the other end of the body operable to urge the plug upward, both of said means being operable to turn the plug.

5. A stop cock including, a body having a fluid passage and a tapered opening intersecting the fluid passage, a tapered plug in the opening operable to close the fluid passage, means at one end of the body operable to urge the plug downward, and means at the other end of the body operable to urge the plug upward, both of said means being operable to jar the plug around.

6. A stop cock including, a body having a fluid passage and a tapered opening intersecting the fluid passage, a tapered plug in the opening operable to close the fluid passage, means for urging the plug longitudinally in the opening including, a spiralled face on an end of the plug, a rotatable stem extending into the body, a head on the inner end of the stem, and a spiralled face on the head for co-operating with the face on the plug, and means independent of the first mentioned means for rotating the plug between the open and closed positions.

7. A stop cock including a body having a fluid passage and a tapered opening intersecting the fluid passage, a rotatable tapered plug in the opening operable to close the fluid passage, means operable to urge the plug endwise in one direction, and means operable to urge the plug endwise in the other direction, both of said means being operable to turn the plug.

8. A stop cock including a body having a fluid passage and a tapered opening intersecting the fluid passage, a tapered plug in the opening operable to close the fluid passage, a normally idle manually operable cam means for urging the plug into the tapered opening, and manually operable means for urging the plug out of the tapered opening, one of said means being operable to turn the plug between the open and closed positions.

9. A stop cock including a body having a fluid passage and a tapered opening intersecting the fluid passage, a tapered plug in the opening operable to close the fluid passage, means operable to urge the plug into the tapered opening including a stem extending into the body, and spiralled faces on the opposing ends of the plug and stem adapted to cooperate to cause longitudinal movement of the plug, and manually operable means for turning the plug and for urging the plug toward the large end of the tapered opening.

10. A stop cock including a body having a fluid passage and a tapered opening intersecting the fluid passage, a tapered plug in the opening operable to close the fluid passage, means for urging the plug toward the small end of the tapered opening including a rotatable stem extending into the body, a head on the stem, spiralled faces on the head and large end of the plug adapted to cooperate upon the plug being turned, and a sealing face on the head adapted to cooperate with the body to seal around the stem and limit movement of the stem, and means at the small end of the plug for urging the plug out of the tapered opening.

CECIL H. SWEET.
WELDON C. ERWIN.